US012680051B2

(12) United States Patent
Delcotto et al.

(10) Patent No.: US 12,680,051 B2
(45) Date of Patent: Jul. 14, 2026

(54) WOODEN WICKS INCLUDING A BOOSTER FOR A CANDLE AND METHOD OF MAKING

(71) Applicant: DELCOTTO IP, LLC, North Huntingdon, PA (US)

(72) Inventors: Melynda Suzanne Delcotto, North Huntingdon, PA (US); Justin Damiani, Youngwood, PA (US)

(73) Assignee: DELCOTTO IP, LLC

( * ) Notice: Subject to any disclaimer, the term of this patent is extended or adjusted under 35 U.S.C. 154(b) by 447 days.

(21) Appl. No.: 18/383,081

(22) Filed: Oct. 24, 2023

(65) Prior Publication Data

US 2024/0052258 A1 Feb. 15, 2024

Related U.S. Application Data

(63) Continuation of application No. 18/097,824, filed on Jan. 17, 2023, now Pat. No. 11,834,623, which is a continuation of application No. 16/813,868, filed on Mar. 10, 2020, now Pat. No. 11,560,528, which is a continuation of application No. 15/711,095, filed on (Continued)

(51) Int. Cl.

| | |
|---|---|
| ***F23D 3/40*** | (2006.01) |
| ***B27D 1/00*** | (2006.01) |
| ***B27M 1/08*** | (2006.01) |
| ***C11C 5/00*** | (2006.01) |
| ***C11C 5/02*** | (2006.01) |
| ***F23D 3/08*** | (2006.01) |
| ***F23D 3/16*** | (2006.01) |

(52) U.S. Cl.

CPC ................ *C11C 5/006* (2013.01); *B27D 1/00* (2013.01); *B27M 1/08* (2013.01); *C11C 5/02* (2013.01); *F23D 3/08* (2013.01); *F23D 3/16* (2013.01); *F23D 3/40* (2013.01)

(58) Field of Classification Search

CPC . C11C 5/006; C11C 5/02; B27D 1/00; B27M 1/08; F23D 3/08; F23D 3/16; F23D 3/40

USPC .......................................................... 431/288

See application file for complete search history.

(56) References Cited

U.S. PATENT DOCUMENTS

| | | | |
|---|---|---|---|
| 52,231 | A | 1/1866 | Walton |
| 59,839 | A | 11/1866 | Hoard |

(Continued)

FOREIGN PATENT DOCUMENTS

| | | |
|---|---|---|
| DE | 314258 | 9/1918 |
| EP | 1245663 | 10/2002 |

(Continued)

OTHER PUBLICATIONS

Firewood for Your Fireplace; Warren Donnelly: Oct. 1974; pp. 18,25,34,35,37,84,85,88-95.

(Continued)

*Primary Examiner* — Avinash A Savani

(74) *Attorney, Agent, or Firm* — Element IP, PLC

(57) ABSTRACT

A wooden wick for use in a wax candle comprising a strip of a predetermined wood having each of a first predetermined length, a first predetermined width and a first predetermined thickness. Such wick further includes a booster member having each of a second predetermined length, a second predetermined width and a second predetermined thickness adhered to the strip of wood.

9 Claims, 1 Drawing Sheet

Related U.S. Application Data

Sep. 21, 2017, now Pat. No. 10,626,348, which is a continuation of application No. 15/165,581, filed on May 26, 2016, now Pat. No. 9,796,946, which is a continuation of application No. 14/802,468, filed on Jul. 17, 2015, now Pat. No. 9,388,365, which is a continuation of application No. 13/296,629, filed on Nov. 15, 2011, now Pat. No. 9,120,995, which is a continuation-in-part of application No. 12/002,819, filed on Dec. 19, 2007, now Pat. No. 8,708,694.

(60) Provisional application No. 60/871,264, filed on Dec. 21, 2006.

(56) References Cited

U.S. PATENT DOCUMENTS

| | | | |
|---|---|---|---|
| 123,917 | A | 2/1872 | Ladd |
| 133,973 | A | 12/1872 | Everett |
| 170,158 | A | 11/1875 | Cushing |
| 170,995 | A | 12/1875 | Daniels |
| 197,902 | A | 12/1877 | Scott |
| 239,855 | A | 4/1881 | Schneider |
| 252,590 | A | 1/1882 | Loper |
| 275,293 | A | 4/1883 | Tisdale |
| 276,602 | A | 5/1883 | Kirk |
| 323,058 | A | 7/1885 | Mitchell |
| 383,822 | A | 5/1888 | Munger |
| 415,231 | A | 11/1889 | Walters |
| 431,033 | A | 7/1890 | Chapin |
| 436,509 | A | 9/1890 | Walters |
| 486,966 | A | 11/1892 | Elsinger |
| 731,033 | A | 6/1903 | Freeman |
| 747,282 | A | 12/1903 | Wallgren |
| 827,066 | A | 7/1906 | Hafner |
| 1,267,968 | A | 5/1918 | Bulle |
| 1,320,109 | A | 10/1919 | Wooster |
| 1,389,490 | A | 8/1921 | Cook et al. |
| 1,475,134 | A | 11/1923 | Oakes |
| 1,576,205 | A | 3/1926 | Mertens |
| 1,636,709 | A | 7/1927 | Schmidt |
| 1,657,391 | A | 1/1928 | Haney |
| 1,660,760 | A | 2/1928 | Murphy |
| 1,756,885 | A | 4/1930 | Schafer |
| 1,831,902 | A | 11/1931 | Brown |
| 1,841,690 | A | 1/1932 | Weindel, Jr. |
| 1,961,920 | A | 6/1934 | Arpin |
| 2,015,383 | A | 9/1935 | Konig et al. |
| 2,107,054 | A | 2/1938 | Haymond |
| D111,775 | S | 10/1938 | Seaver |
| 2,168,698 | A | 8/1939 | Bunt et al. |
| 2,241,167 | A | 5/1941 | Storck |
| 2,324,753 | A | 7/1943 | Alexiade |
| 2,354,343 | A | 7/1944 | Webber et al. |
| 2,373,512 | A | 4/1945 | Starner |
| 2,376,083 | A | 5/1945 | Quinn |
| 2,464,361 | A | 3/1949 | Wilson |
| 2,570,841 | A | 10/1951 | O'Connor |
| 2,611,254 | A | 9/1952 | Byrnes |
| D178,200 | S | 7/1956 | McKenzie et al. |
| 2,758,460 | A | 8/1956 | Ciano |
| 2,809,512 | A | 10/1957 | Hartnett |
| 2,811,428 | A | 10/1957 | Smith |
| 2,959,950 | A | 11/1960 | Weglin |
| 3,039,283 | A | 6/1962 | Buscemi |
| 3,086,658 | A | 4/1963 | Palmer |
| 3,175,876 | A | 3/1965 | Fredericks |
| 3,269,807 | A | 8/1966 | Key, Jr. |
| 3,286,492 | A | 11/1966 | Frazier, Jr. |
| 3,367,758 | A | 2/1968 | Ambrose et al. |
| 3,380,797 | A | 4/1968 | Summers |
| 3,428,409 | A | 2/1969 | Summers |
| 3,462,235 | A | 8/1969 | Summer |
| 3,466,135 | A | 9/1969 | Summers |
| 3,495,924 | A | 2/1970 | Seni et al. |
| 3,560,122 | A | 2/1971 | Cassar |
| 3,582,251 | A | 6/1971 | Concannan |
| 3,637,335 | A | 1/1972 | Uhl |
| 3,652,197 | A | 3/1972 | Tokarz |
| 3,706,523 | A | 12/1972 | Kumm |
| 3,759,478 | A | 9/1973 | Schmitt et al. |
| 3,761,702 | A | 9/1973 | Andeweg |
| 3,883,143 | A | 5/1975 | Kelley et al. |
| 3,998,922 | A | 12/1976 | Weiss |
| 4,304,547 | A | 12/1981 | Buzil |
| 4,380,200 | A | 4/1983 | Reninger |
| 4,381,914 | A | 5/1983 | Ferguson |
| 4,386,904 | A | 6/1983 | Miyahara et al. |
| 4,449,987 | A | 5/1984 | Lindauer |
| 4,477,249 | A | 10/1984 | Ruzek et al. |
| 4,557,687 | A | 12/1985 | Schirneker |
| 4,568,269 | A | 2/1986 | Lin |
| 4,568,270 | A | 2/1986 | Marcus et al. |
| 4,682,947 | A | 7/1987 | Luken, Jr. |
| 4,696,640 | A | 9/1987 | Pitchford |
| 4,725,286 | A | 2/1988 | Brame |
| 4,804,323 | A | 2/1989 | Kim |
| D301,749 | S | 6/1989 | Comstock |
| 4,839,144 | A | 6/1989 | Martin |
| 4,855,098 | A | 8/1989 | Taylor |
| 4,917,597 | A | 4/1990 | Henze |
| 5,015,175 | A | 5/1991 | Lee |
| 5,069,617 | A | 12/1991 | Lin |
| D350,566 | S | 9/1994 | Pearson |
| 5,354,197 | A | 10/1994 | Barone |
| 5,363,590 | A | 11/1994 | Lee |
| 5,487,658 | A | 1/1996 | Lee |
| 5,597,300 | A | 1/1997 | Wohl et al. |
| 5,683,239 | A | 11/1997 | Cardosi |
| 5,683,762 | A | 11/1997 | Banschick |
| 5,690,484 | A | 11/1997 | Leonard et al. |
| 5,762,487 | A | 6/1998 | Kujawski |
| 5,772,424 | A | 6/1998 | Nokelainen |
| D397,459 | S | 8/1998 | Hsu |
| 5,807,096 | A | 9/1998 | Shin et al. |
| 5,830,245 | A | 11/1998 | Raddon |
| 5,842,850 | A | 12/1998 | Pappas |
| 5,846,070 | A | 12/1998 | Kim et al. |
| 5,879,153 | A | 3/1999 | Slejertin |
| 5,967,769 | A | 10/1999 | Thompson |
| 6,017,373 | A | 1/2000 | Frisch |
| 6,033,210 | A | 3/2000 | Freeman |
| 6,063,144 | A | 5/2000 | Calzada et al. |
| 6,068,472 | A | 5/2000 | Freeman et al. |
| 6,074,199 | A | 6/2000 | Song |
| 6,076,515 | A | 6/2000 | Smith |
| 6,129,771 | A | 10/2000 | Ficke |
| 6,214,295 | B1 | 4/2001 | Freeman |
| 6,241,512 | B1 | 6/2001 | Freeman et al. |
| 6,276,925 | B1 | 8/2001 | Varga |
| D456,537 | S | 4/2002 | Leeds |
| D458,394 | S | 6/2002 | Leeds |
| D459,498 | S | 6/2002 | Araujo |
| 6,405,441 | B1 | 6/2002 | Rucker |
| 6,409,501 | B1 | 6/2002 | Pappas |
| 6,419,713 | B1 | 7/2002 | Durand et al. |
| 6,440,184 | B2 | 8/2002 | Noda et al. |
| 6,444,156 | B1 | 9/2002 | Schwarz et al. |
| 6,454,561 | B1 | 9/2002 | Colthar et al. |
| 6,471,899 | B2 | 10/2002 | Daiber et al. |
| D466,632 | S | 12/2002 | Lablaine |
| 6,508,644 | B1 | 1/2003 | Pesu et al. |
| 6,554,448 | B2 | 4/2003 | Carpenter |
| 6,568,934 | B1 | 5/2003 | Butler |
| D481,142 | S | 10/2003 | Leeds |
| 6,783,356 | B2 | 8/2004 | Hermanson |
| D496,474 | S | 9/2004 | Murdick |
| 6,793,697 | B2 | 9/2004 | Sprules et al. |
| 6,823,780 | B2 | 11/2004 | Vogt et al. |
| 6,921,260 | B2 | 7/2005 | Garnys |
| 6,991,453 | B2 | 1/2006 | Decker et al. |
| D590,078 | S | 4/2009 | Horenziak et al. |
| 7,524,339 | B2 | 4/2009 | Decker et al. |
| 7,568,913 | B2 | 8/2009 | Decker et al. |

(56) References Cited

U.S. PATENT DOCUMENTS

| | | | |
|---|---|---|---|
| 7,850,444 B2 | 12/2010 | Kubicek et al. |
| D637,741 S | 5/2011 | Horenziak et al. |
| D643,554 S | 8/2011 | Decker |
| D644,359 S | 8/2011 | Decker |
| D644,360 S | 8/2011 | Decker |
| D658,316 S | 4/2012 | Van Dijk |
| D663,450 S | 7/2012 | Delcotto et al. |
| D669,615 S | 10/2012 | Delcotto et al. |
| 8,348,662 B2 | 1/2013 | Decker |
| D678,558 S | 3/2013 | Decker |
| 8,708,694 B2 | 4/2014 | Delcotto et al. |
| D705,459 S | 5/2014 | Decker |
| D708,777 S | 7/2014 | Delcotto et al. |
| D715,989 S | 10/2014 | Delcotto et al. |
| 8,961,171 B2 | 2/2015 | Decker |
| 9,039,409 B2 | 5/2015 | Decker |
| 9,120,995 B2 | 9/2015 | Delcotto et al. |
| D740,461 S | 10/2015 | Decker |
| 9,261,275 B2 | 2/2016 | Decker |
| 9,410,696 B2 | 8/2016 | Decker |
| 2001/0029003 A1 | 10/2001 | Zou |
| 2001/0043469 A1 | 11/2001 | Carpenter et al. |
| 2002/0013444 A1 | 1/2002 | Jones et al. |
| 2002/0018976 A1 | 2/2002 | Zou |
| 2002/0022205 A1 | 2/2002 | Elliott et al. |
| 2003/0036028 A1 | 2/2003 | Pesu et al. |
| 2003/0162142 A1 | 8/2003 | Bennetts et al. |
| 2003/0235797 A1 | 12/2003 | McCullough |
| 2004/0008509 A1 | 1/2004 | Decker et al. |
| 2004/0009447 A1 | 1/2004 | Decker |
| 2004/0029061 A1 | 2/2004 | Dibnah et al. |
| 2004/0033463 A1 | 2/2004 | Pesu et al. |
| 2005/0037307 A1 | 2/2005 | Decker et al. |
| 2005/0037308 A1 | 2/2005 | Decker |
| 2005/0115145 A1 | 6/2005 | Decker et al. |
| 2006/0172242 A1 | 8/2006 | Collard |
| 2008/0153046 A1 | 6/2008 | Delcotto et al. |
| 2011/0024945 A1 | 2/2011 | Decker |
| 2011/0027735 A1 | 2/2011 | Decker |
| 2011/0027736 A1 | 2/2011 | Decker |
| 2011/0027737 A1 | 2/2011 | Decker |
| 2011/0225392 A1 | 9/2011 | Barry et al. |
| 2012/0064467 A1 | 3/2012 | Delcotto et al. |
| 2012/0129114 A1 | 5/2012 | Barresi |
| 2012/0148966 A1 | 6/2012 | Ramaker et al. |
| 2012/0202160 A1 | 8/2012 | Ford |
| 2012/0264069 A1 | 10/2012 | Ramirez |
| 2013/0095440 A1 | 4/2013 | Cagle et al. |
| 2013/0112346 A1 | 5/2013 | Cagle et al. |
| 2015/0322379 A1 | 11/2015 | Delcotto et al. |

FOREIGN PATENT DOCUMENTS

| | | |
|---|---|---|
| FR | 2 639 356 | 5/1990 |
| FR | 2 725 372 | 4/1996 |
| FR | 2 726 573 | 5/1996 |
| FR | 2 811 676 | 1/2002 |
| GB | 16702 | 3/1915 |
| GB | 191516702 | 3/1916 |
| GB | 118741 | 11/1917 |
| GB | 1238214 | 9/1968 |
| GB | 1558713 | 3/1977 |
| JP | 2932371 | 5/1999 |
| SE | 9903818 | 5/2000 |

OTHER PUBLICATIONS

Www.CLARLUSSP.com/candles/index.php, "Waxes: Candles." Internet printout on Jul. 6, 2006, 1 page.

www.weteslit.com/wax.htm, "Wax." Internet printout on Jul. 6, 2006, 3 pages.

European Office Action issued Aug. 30, 2017, in European patent Application No. 12 191 762.9.

Improvements Catalog, [Online], [Retrieved on Jan. 11, 2005], Retrieved from the Internet: http://www.improvementscatalog.com/Parent.asp?product=240717x&dept%5Fid=300&subdept%5Fid=304>.

World Flame Catalog, [Online], [Retrieved on Jan. 11, 2005], Retrieved from the Internet: http:f/www.golighttheworld.com/Store/ProductJCategoryInfo.aspx?cid=7>.

World Flame Catalog, [Online], [Retrieved on Jan. 11, 2005]. Retrieved from the Internet: http://www.golighttheworld.com/Store/ProducUCategoryInfo.aspx?cid=17>.

Norma Coney, 2000, Lark Books, Deborah Morgenthal, pp. 16, 49-50, & 55-58.

Request for Ex Parte Reexamination of U.S. Pat. No. 8,961,171, dated Apr. 29, 2016.

Request for Ex Parte Reexamination of U.S. Pat. No. 8,961,171; Replacement Detailed Request dated Jun. 10, 2016.

Internet Article, "Wood Candle Wicks—Crackling Wooden Wicks," http://www.woodcandlewick.com, p. 1-6 (Sep. 28, 2015}.

Internet Article, "Wood Candle Wicks—Crackling Wooden Wicks," http:f/www.woodcandlewick.com p. 1-6 (Sep. 28, 2015).

Nussle, W., "Candle Crafting from an Art to a Science," A.S. Barnes and Co., Inc. (1971} pp. 16-17.

Olden, D ., "Candles that Eam", Peanut Butter Publishing, (1990), Chapter 8, pp. 153-160.

Olden, D ., "Candles that Earn", Peanut Butter Publishing, (1990), Chapter 7, pp. 133-153.

Robbins, F.W., "The Story of the Lamp (and the Candle)", (Reprint 1970), Kingsmead Reprints. Bath, pp. 16-23.

Wood Handbook, Wood as an Engineering Material, Centennial Edition, USDA (Apr. 2010).

Global Design Database, Registration No. 49900086-0001 (Apr. 11, 2019).

Global Design Database, Registration No. 40100590-0029 (Apr. 11, 2019).

WOODEN WICKS INCLUDING A BOOSTER FOR A CANDLE AND METHOD OF MAKING

CROSS REFERENCE TO RELATED APPLICATION

This patent application is related to and claims priority from U.S. Provisional Patent Application Ser. No. 60/871,264 filed Dec. 21, 2006.

FIELD OF THE INVENTION

The present invention relates, in general, to wicks for candles and, more particularly, this invention relates to a wooden wick equipped with a booster for a candle and to a method of making such wooden wick.

BACKGROUND OF THE INVENTION

Prior to the conception and development of the present invention, as is generally well known in the prior art, candles and wicks which are lit to provide a flame and which melts the wax surrounding such wick have been in existence and commercially available for many years.

These prior art type wicks have normally been produced from a cloth fiber and are embedded into an appropriate portion of the wax, generally in the center, forming the candle. Wicks formed from pieces of wood have also been used, however, these wooden wicks have been formed as a single piece of wood which has a number of distinct disadvantages.

One particular disadvantage of these prior art type wooden wicks is that they are not attractive. Another important disadvantage of the prior art wooden wicks is that they do not come equipped with a booster.

SUMMARY OF THE INVENTION

The present invention provides, in a first aspect, a wooden wick for use in a wax candle. This wooden wick includes a strip of a predetermined wood having each of a first predetermined length, a first predetermined width and a first predetermined thickness. Such wick further includes a booster member having each of a second predetermined length, a second predetermined width and a second predetermined thickness and a means for adhering the booster member to such strip of wood.

In a second aspect, the present invention provides a method of manufacturing a wooden wick for use in a wax candle. The method includes the steps of selecting a type of wood to be formed into a strip of wood to be used in the wooden wick. Thereafter, cutting such wood selected into such strip having each of a first predetermined length, a first predetermined width and a first predetermined thickness.

The method further includes forming a booster member having each of a second predetermined length, a second predetermined width and a second predetermined thickness and adhering such booster member to the strip of wood.

OBJECTS OF THE INVENTION

It is, therefore, one of the primary objects of the present invention to provide an improved wooden wick for use in a wax type candle.

Another object of the present invention is to provide a method of producing such wooden wick.

Still another object of the present invention is to provide a wooden wick for use in a wax candle which is relatively inexpensive to produce.

Yet another object of the present invention is to provide a wooden wick for a wax candle which has enhanced visual appeal.

An additional object of the present invention is to provide a method of producing a wooden wick for a wax candle which will exhibit enhanced visual appeal.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
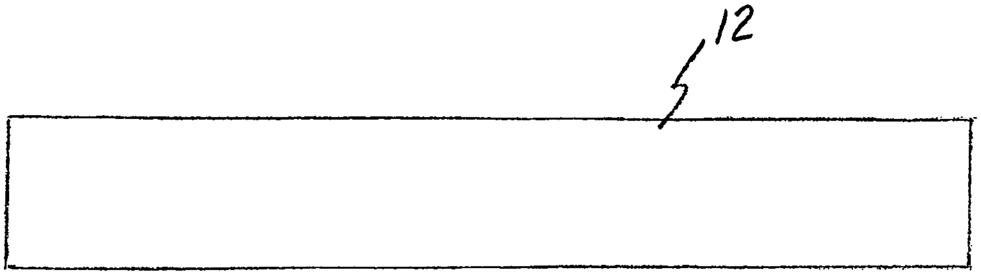
FIG. 1 is a plan view of the wood portion of the wooden wick according to a presently preferred embodiment of the invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
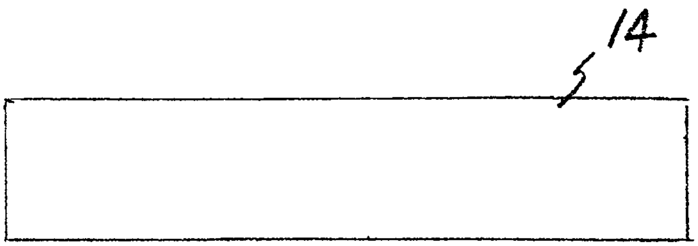
FIG. 2 is a plan view of the booster portion for use with the wooden wick illustrated in FIG. 1 according to the presently preferred embodiment of the invention.
Figure 3:
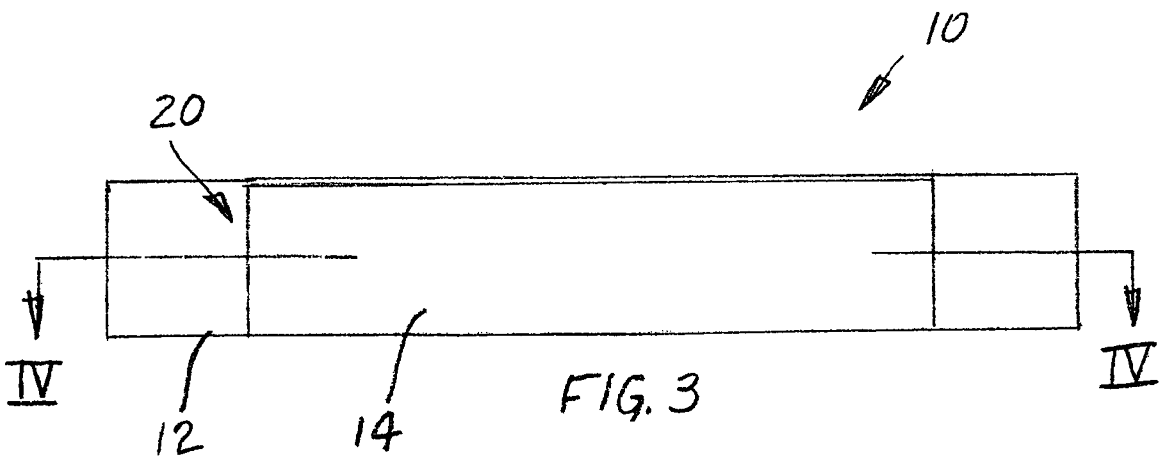
FIG. 3 is a plan view of the wooden wick illustrating the wooden portion illustrated in FIG. 1 adhered to the booster portion illustrated in FIG. 2 according to the presently preferred embodiment of the invention.
Figure 4:
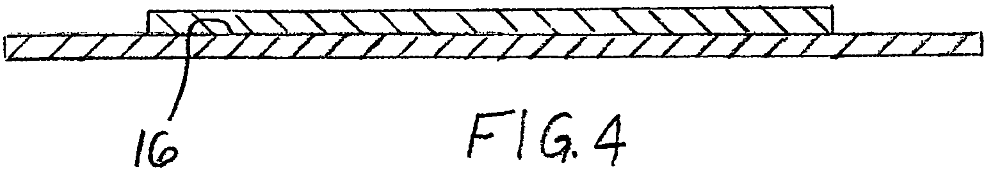
FIG. 4 is a cross sectional view taken along the lines iv-iv of FIG. 3.

Reference is now made, more particularly, to FIGS. 1-4. Illustrated therein is a wooden wick, generally designated 10, for use in a wax candle (not shown). The wooden wick 10 includes a strip of a predetermined wood 12 having each of a first predetermined length, a first predetermined width and a first predetermined thickness. In the presently preferred embodiment of the invention, the first predetermined length of such strip of wood 12 will generally be between about 4.375 and about 5.125 inches. In this embodiment, the first predetermined width of the strip of wood 12 will generally be between about 0.70 inch and about 0.80 inch.

Further, the wooden wick, according to the present invention, includes a booster member 14 having each of a second predetermined length, a second predetermined width and a second predetermined thickness and a means, generally designated 20, for adhering the booster member 14 to such strip of wood 12. Such means 20 is preferably an adhesive layer 16.

In the presently preferred embodiment of the invention, the second predetermined length of such booster member 14 will generally be between about 3.45 and about 3.55 inches and the second predetermined width of the booster member 14 will generally be between about 0.70 inch and about 0.80 inch. Further, in this embodiment such first and second predetermined thickness will be substantially identical.

The wooden wick 10 further includes a coloring agent to stain the wooden strip 12 for enhancing a visual appearance thereof. Preferably, such coloring agent is a vegetable type coloring agent.

The present invention provides, in a second aspect a method of manufacturing a wooden wick for use in a wax candle. The method includes selecting a type of wood to be formed into a strip of wood to be used in such wooden wick. Then, cutting the wood selected into such strip having each of a first predetermined length, a first predetermined width and a first predetermined thickness.

Additionally, the method includes forming a booster member having each of a second predetermined length, a second predetermined width and a second predetermined thickness and then adhering such booster member to such strip of wood. Preferably, an adhesive is selected for adhering the booster member to such strip of wood.

In the preferred embodiment, such method further includes an addition step of ensuring that the strip of wood is clean before such strip of wood is adhered to the booster member and further that such strip of wood is treated with a liquid wax and that the wooden wick is cured, preferably by baking, prior to use in such candle. It is further preferred that the booster member be soaked in a soy oil prior to adhering it to said strip of wood. Thereafter said booster member is coated with a wax type material.

Additionally, the method includes an additional step of drying the wooden wick for a predetermined time generally for about 48.0 hours, prior to use in such candle.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. A wooden wick, comprising:

a strip of wood having a first length, a first width, and a first thickness; and a booster member having a second length, a second width, and a second thickness;

wherein:

the first length is greater than the first width, and the first width is greater than the first thickness;

the strip of wood has a first surface defined by the first length and the first width;

the second length is greater than the second width, and the second width is greater than the second thickness;

the booster member has a second surface defined by the second width and the second length;

the first strip of wood is in contact with the second strip of wood along at least a portion of its length; and the first surface of the strip of wood does not contact the second surface of the booster along an entirety of its length.

2. The wooden wick according to claim 1, wherein the first length of the strip of wood is 4.375 to 5.125 inches.

3. The wooden wick according to claim 1, wherein the first width of the strip of wood is 0.70 inch to 0.80 inches.

4. The wooden wick according to claim 1, wherein the second length of the booster member is 3.45 to 3.55 inches.

5. The wooden wick according to claim 1, wherein the second width of the booster member is 0.70 to 0.80 inches.

6. The wooden wick according to claim 1, wherein the first and the second thickness are substantially identical.

7. The wooden wick according to claim 1, wherein A wooden wick, according to claim 1, wherein the wooden wick further comprise a coloring agent staining the wood.

8. The wooden wick according to claim 7, wherein the coloring agent is a vegetable coloring agent.

9. A wax candle, comprising the wooden wick according to claim 1.

* * * * *